United States Patent
Yamano

(10) Patent No.: US 9,210,284 B2
(45) Date of Patent: Dec. 8, 2015

(54) IMAGE FORMING APPARATUS, INFORMATION PROCESSING APPARATUS, CONTROL METHOD FOR IMAGE FORMING APPARATUS, AND STORAGE MEDIUM

(75) Inventor: Hiroshi Yamano, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 539 days.

(21) Appl. No.: 13/463,095

(22) Filed: May 3, 2012

(65) Prior Publication Data

US 2012/0287467 A1    Nov. 15, 2012

(30) Foreign Application Priority Data

May 9, 2011    (JP) .................. 2011-104054

(51) Int. Cl.
*H04N 1/00* (2006.01)
*G06F 1/32* (2006.01)
*G06F 3/12* (2006.01)

(52) U.S. Cl.
CPC .......... *H04N 1/00891* (2013.01); *G06F 1/3209* (2013.01); *G06F 1/3284* (2013.01); *G06F 3/1221* (2013.01); *G06F 3/1236* (2013.01); *G06F 3/1284* (2013.01); *G06F 3/1285* (2013.01); *H04N 1/00904* (2013.01); *Y02B 60/1267* (2013.01); *Y02B 60/1271* (2013.01); *Y02B 60/32* (2013.01)

(58) Field of Classification Search
CPC .............................. G06F 1/3278; G06F 1/3284
See application file for complete search history.

(56) References Cited

U.S. PATENT DOCUMENTS

| | | | |
|---|---|---|---|
| 6,237,106 B1 * | 5/2001 | Koyama et al. | 713/502 |
| 2004/0153676 A1 * | 8/2004 | Krantz et al. | 713/300 |
| 2006/0217072 A1 * | 9/2006 | Poyhonen et al. | 455/67.11 |
| 2007/0043884 A1 * | 2/2007 | Watanabe | 710/15 |
| 2009/0103597 A1 * | 4/2009 | Choi et al. | 375/222 |

FOREIGN PATENT DOCUMENTS

| | | | |
|---|---|---|---|
| JP | 11-085420 | * | 3/1999 |
| JP | 2000-309142 A | | 11/2000 |
| JP | 2003-200635 A | | 7/2003 |
| JP | 2012-006285 A | | 1/2012 |

* cited by examiner

*Primary Examiner* — King Poon
*Assistant Examiner* — Vincent Peren
(74) *Attorney, Agent, or Firm* — Canon U.S.A., Inc., IP Division

(57) ABSTRACT

An image forming apparatus communicates with a plurality of data processing apparatuses via a plurality of interfaces. The image forming apparatus includes a determination unit configured to determine a communication state with the plurality of interfaces, and a control unit configured to perform control to switch between a first sleep mode in which power supplied to any one of the plurality of interfaces is turned off and a second sleep mode in which power supplied to the plurality of interfaces is repeatedly turned on and off at predetermined time intervals according to the communication state determined by the determination unit.

7 Claims, 9 Drawing Sheets

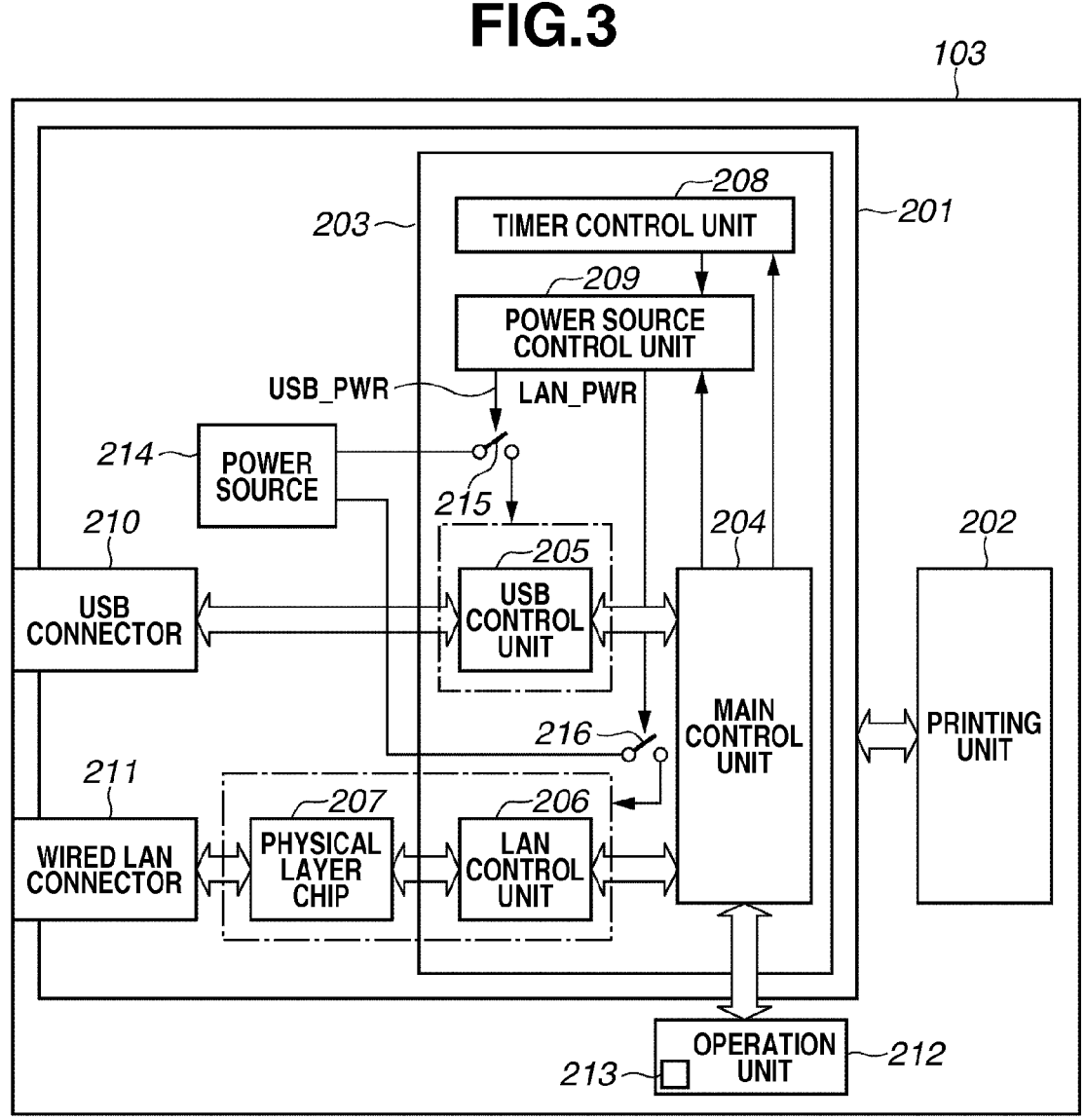

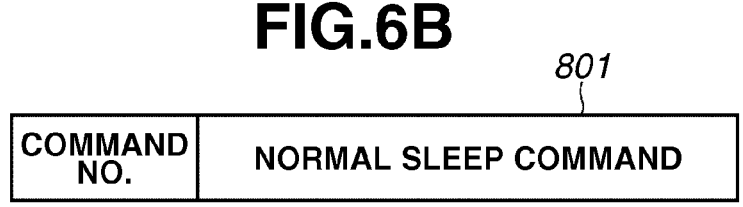
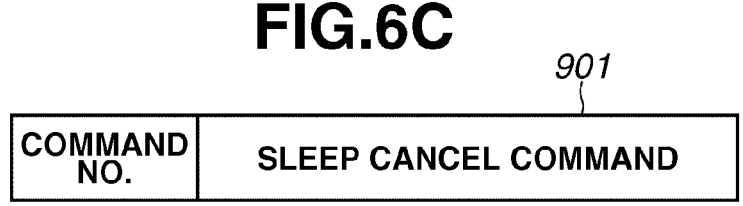
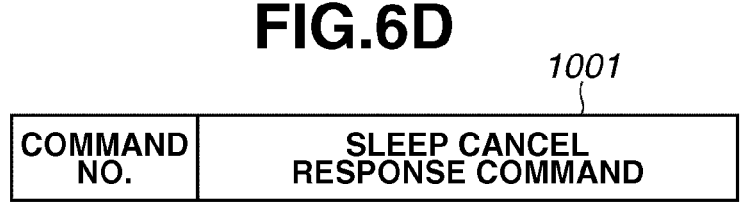

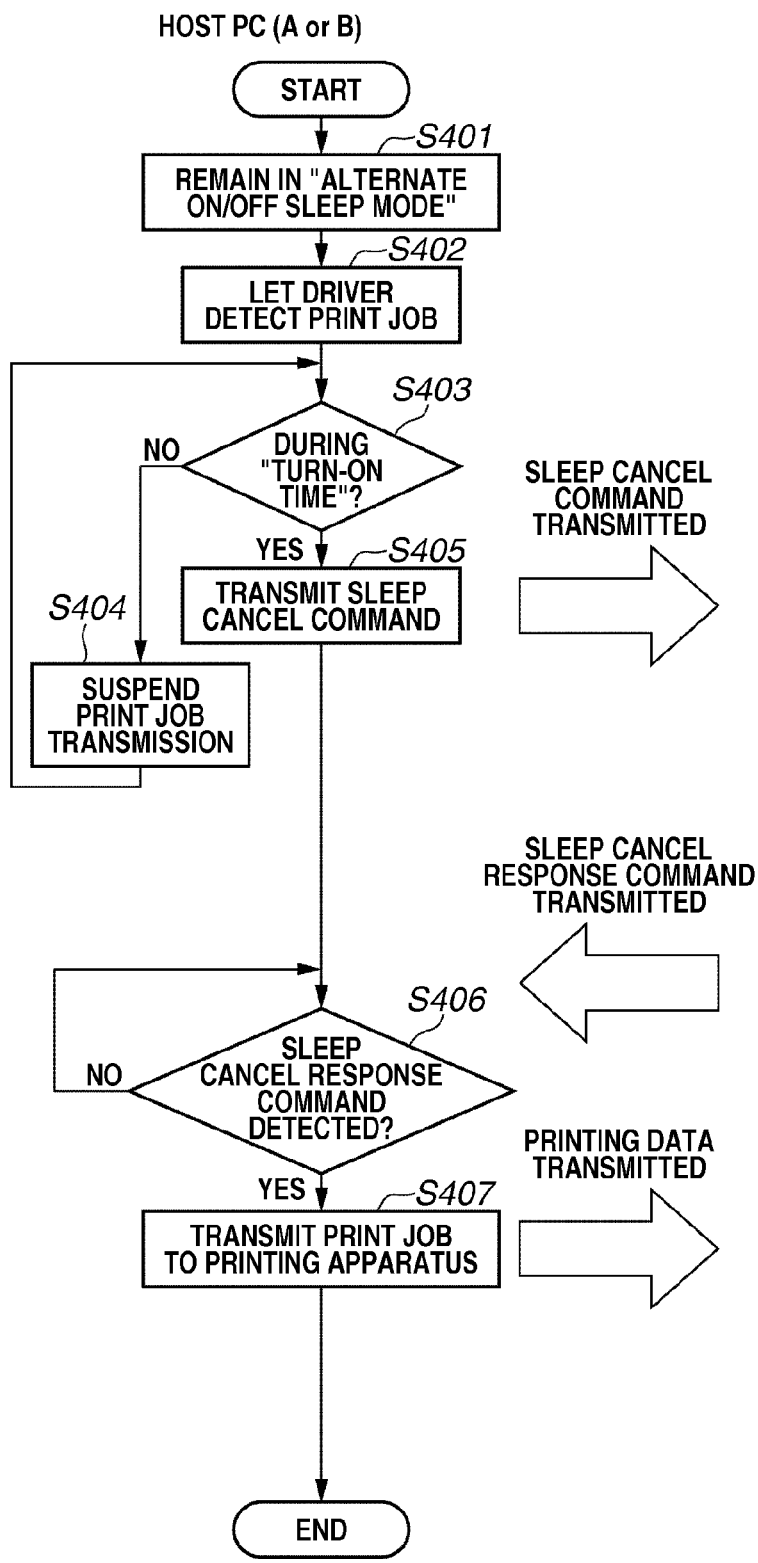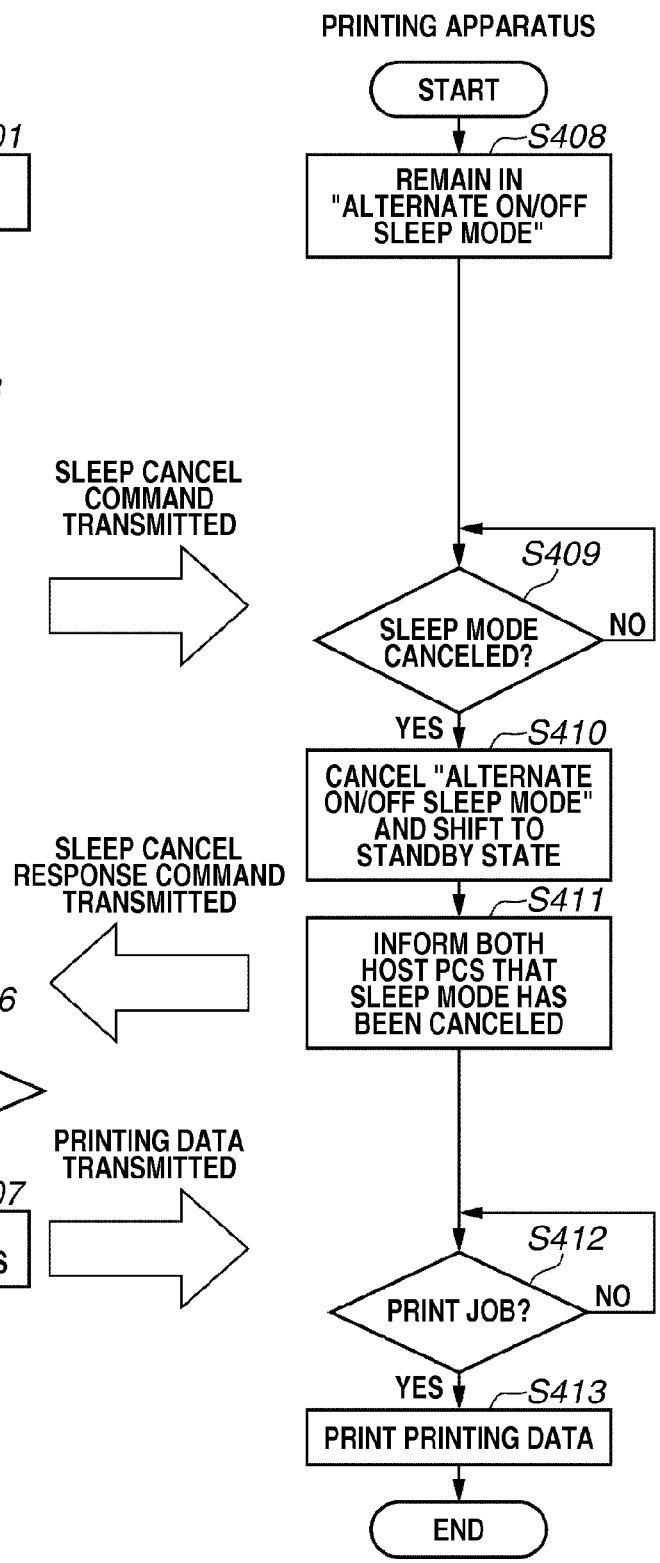

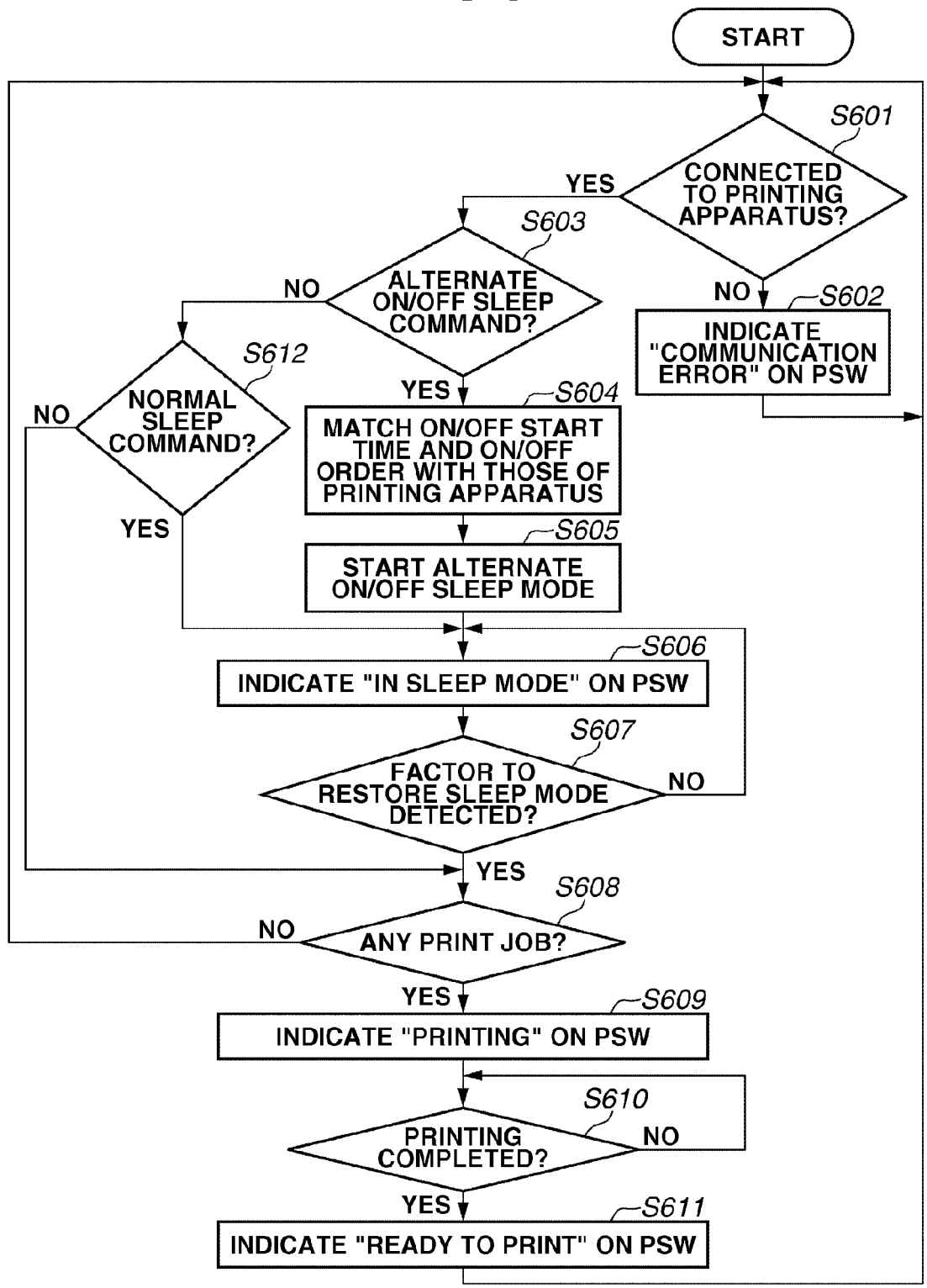

IMAGE FORMING APPARATUS, INFORMATION PROCESSING APPARATUS, CONTROL METHOD FOR IMAGE FORMING APPARATUS, AND STORAGE MEDIUM

BACKGROUND OF THE INVENTION

1. Field of the Invention

The present invention relates to an image forming apparatus, an information processing apparatus, a control method for the image forming apparatus, and a storage medium.

2. Description of the Related Art

In recent years, various apparatuses including a printing apparatus have been equipped with a function by which the apparatus as a whole is shifted to a sleep mode when not being used. Conventionally, a system is available in which when a printing apparatus capable of connecting to a plurality of interfaces is shifted to a sleep mode, the power source of interface control units inside the printing apparatus is reduced to a lower level, which is enough to establish communication, to achieve a reduction in the power consumption of the apparatus as a whole (See Japanese Patent Application Laid-Open No. 2000-309142).

However, according to the technique discussed in Japanese Patent Application Laid-Open No. 2000-309142, the power is also supplied to an interface control unit which is connected to a data processing apparatus but is not being used. Thus, even when the printing apparatus is shifted to the sleep mode, the power applied to the interface control units is added, so that the power consumed by the entire printing apparatus cannot be reduced.

Conversely, if the power for each of the control units of the plurality of interfaces is all turned off, connection to the data processing apparatus cannot be established in the sleep mode.

In addition, on the data processing apparatus side, a message is not switched to a proper one in conjunction with the switching in the power supply to the interfaces, so that a user on the data processing apparatus side cannot properly make out the sleep state of the printing apparatus.

SUMMARY OF THE INVENTION

One aspect of the present invention is directed to a system including a printing apparatus equipped with a plurality of interfaces, where power supply to each interface is intermittently switched to achieve reduction in the power supplies to each interface. In addition, the system also includes a data processing apparatus that provides a display enabling a user on the data processing apparatus side to determine a sleep state of the printing apparatus.

According to an aspect of the present invention, an image forming apparatus that communicates with a plurality of data processing apparatuses via a plurality of interfaces includes a determination unit configured to determine a communication state with the plurality of interfaces, and a control unit configured to perform control to switch between a first sleep mode in which power supplied to any one of the plurality of interfaces is turned off and a second sleep mode in which power supplied to the plurality of interfaces is repeatedly turned on and off at predetermined time intervals according to the communication state.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 3 is a block diagram illustrating a system configuration of the printing apparatus illustrated in FIG. 1.

FIGS. 6A through 6D illustrate examples of a status informing command.

FIGS. 7A and 7B are flowcharts illustrating a power source control method for the printing system.

FIG. 9 is a flowchart illustrating a job processing method for the data processing apparatus.

DESCRIPTION OF THE EMBODIMENTS

Various exemplary embodiments, features, and aspects of the invention will be described in detail below with reference to the drawings.

<Description of System Configuration>

Figure 1:
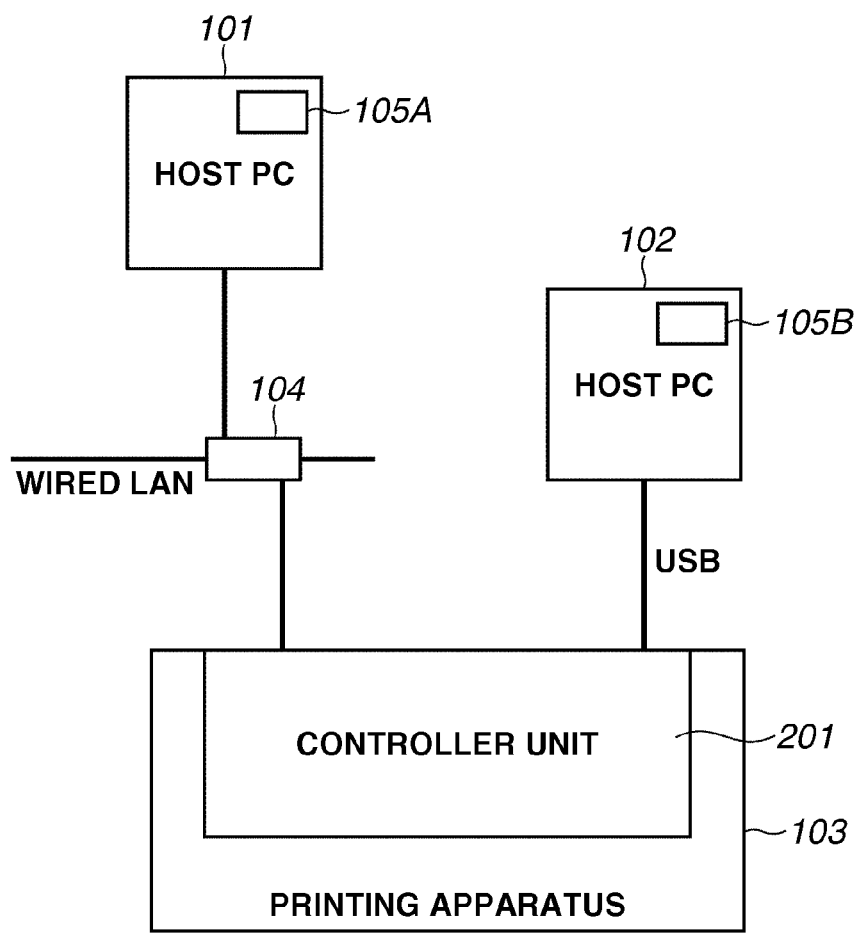
FIG. 1 is a block diagram illustrating a system configuration of a printing system to which a printing apparatus is applied.

FIG. 1 is a block diagram illustrating a configuration of a printing system to which a printing apparatus according to an exemplary embodiment of the present invention is applied. In the printing system of the present embodiment, a plurality of data processing apparatuses is connected to interfaces of a printing apparatus 103. Each of the data processing apparatus is equipped with a display device (display unit), an input unit, and a control unit. An application referred to as a printer status window (PSW) and configured to indicate a condition of the printing apparatus is installed in the display device. The data processing apparatuses communicate with the printing apparatus 103 via the PSW to determine a state of a sleep mode thereof, and execute display control to update and display the state of the printing apparatus on a user interface screen, which is described below.

In FIG. 1, a status display window 105A displays a status related to the printing apparatus 103, to which a data processing apparatus 101 is network-connected via a HUB 104. A status display window 105B displays a status related to the printing apparatus 103, to which a data processing apparatus 102 is local-connected via a universal serial bus (USB) cable.

FIGS. 2A through 2D illustrate examples of user interface screens that can be displayed on the display device with which each data processing apparatus illustrated in FIG. 1 is equipped. In the present embodiment, the user interface screen is the status display window. A message corresponding to the state of the printing apparatus 103 is updated and displayed on the status display window in accordance with control described below.

The data processing apparatus 101 and the printing apparatus 103 are connected by a wired local-area network (LAN) via the HUB 104 for a wired LAN. The data processing apparatus 102 and the printing apparatus 103 are connected to each other by a USB. Inside the printing apparatus 103, a controller unit 201 performs the processing of a print job and the control of the printing apparatus 103.

In the data processing apparatus 101 and the data processing apparatus 102, the user issues a printing command with use of an image and a text edit application on the data processing apparatus 101 or the data processing apparatus 102. Further, a compression processing is performed on an image or a text file to be printed as an image processing and print job.

FIG. 3 is a block diagram illustrating the configuration of the printing apparatus 103 illustrated in FIG. 1. In FIG. 3, the printing apparatus 103 expands the print job compressed by the data processing apparatus 101 or the data processing apparatus 102 and performs printing on a recording medium.

The controller unit 201 performs image processing or the like for the printing apparatus 103. A printing unit 202 prints the print job on a recording medium. A main control integrated circuit (IC) 203 provided inside the controller unit 201 is an IC including a main control unit 204, a power source control unit 209, a timer control unit 208, a USB control unit 205, and a LAN control unit 206. In the present embodiment, although the above-described control units are provided collectively as one IC, each control unit can be provided as an individual IC. The main control unit 204 is also a portion combining a central processing unit (CPU), memory (random-access memory (RAM)), and other logic circuits.

The power source control unit 209 and the timer control unit 208 are configured to perform power source control on the USB control unit 205 and the LAN control unit 206. In the state in which electricity is being supplied to the USB control unit 205 and the LAN control unit 206, the main control unit 204 turns on switches 215 and 216 (i.e., places them in a connected state) using a USB_PWR signal and a LAN_PWR signal via the power source control unit 209.

In the state in which no electricity is being supplied to the USB control unit 205 and the LAN control unit 206, the main control unit 204 turns off the switches 215 and 216 (i.e., places them in an unconnected state) using the USB_PWR signal and the LAN_PWR signal via the power source control unit 209. The main control unit 204 alternately performs the above operations with a timing controlled by the timer control unit 208 and through an operation control by the power source control unit 209.

A wired LAN connector 211 is connected to the data processing apparatus 101 by the LAN cable via the HUB 104. A USB connector 210 is connected to the data processing apparatus 102 by the USB cable.

The USB control unit 205 controls communication with the data processing apparatus connected by the USB cable. The USB control unit 205 detects whether connection is established with the data processing apparatus 102 via the USB cable, and informs the main control unit 204 of the detection result.

The LAN control unit 206 controls a data transmission and reception method via the wired LAN, a frame format, an error detection method, and the like. A physical layer chip 207 is a portion which directly controls a signal in the LAN. When the printing apparatus 103 is placed in the sleep mode, the power consumption of the physical layer chip 207 itself is also reduced through a reduction in the communication speed of the wired LAN.

The physical layer chip 207 also serves to detect whether connection with the data processing apparatus 101 is established via the LAN cable, and to inform the main control unit 204 of the detection result via the LAN control unit 206.

In the diagram, the USB_PWR signal is a signal for supplying and stopping the power to the USB control unit 205. In the diagram, the LAN_PWR signal is a signal for simultaneously supplying and stopping the power to the LAN control unit 206 and the physical layer chip 207.

An operation unit 212 is an operation interface unit used when the user performs operations, settings, and the like on the printing apparatus 103. A key 213 on the operation unit 212 operates as a sleep factor or a restoring factor on the printing apparatus 103 in the sleep mode.

Figure 4:
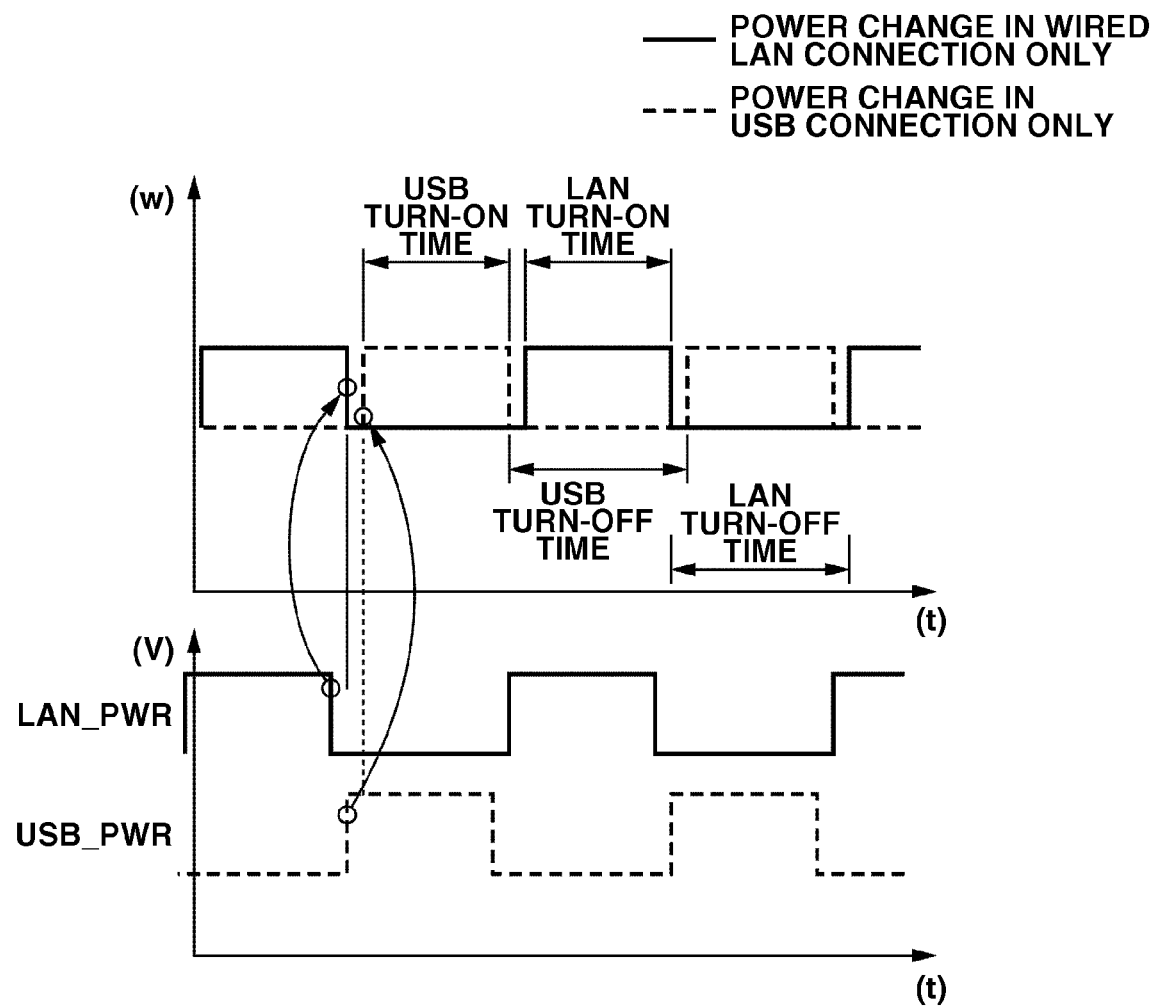
FIG. 4 is a timing chart illustrating operations of the printing apparatus illustrated in FIG. 3.

Based on the above-described configuration, an operation sequence according to the present exemplary embodiment will be described with reference to FIG. 4. FIG. 4 is a timing chart illustrating the operation of the printing apparatus illustrated in FIG. 3. In the following, "turning ON" and "turning OFF" in the "alternate turning ON/OFF" will be described.

FIG. 4 illustrates a change in the power of the printing apparatus 103 main body when power is alternately supplied to the USB control unit 205 and to the LAN control unit 206 and the physical layer chip 207 in a configuration in which the printing apparatus 103 is connected to the data processing apparatuses via the wired LAN and the USB. The above-described change in the power is in synchronization with a change in the LAN_PWR signal and the USB_PBR signal output from the power source control unit 209. In FIG. 4, the term "USB turn-ON time" refers to a state in which the USB_PWR signal is "H" and the LAN_PWR signal is "L", and in which the power is supplied to the USB control unit 205 and no power is supplied to the LAN control unit 206 and the physical layer chip 207.

The term "LAN turn-ON time" refers to a state in which the USB_PWR signal is "L" and the LAN_PWR signal is "H", and in which no power is supplied to the USB control unit 205 and the power is supplied to the LAN control unit 206 and the physical layer chip 207.

Figure 5:
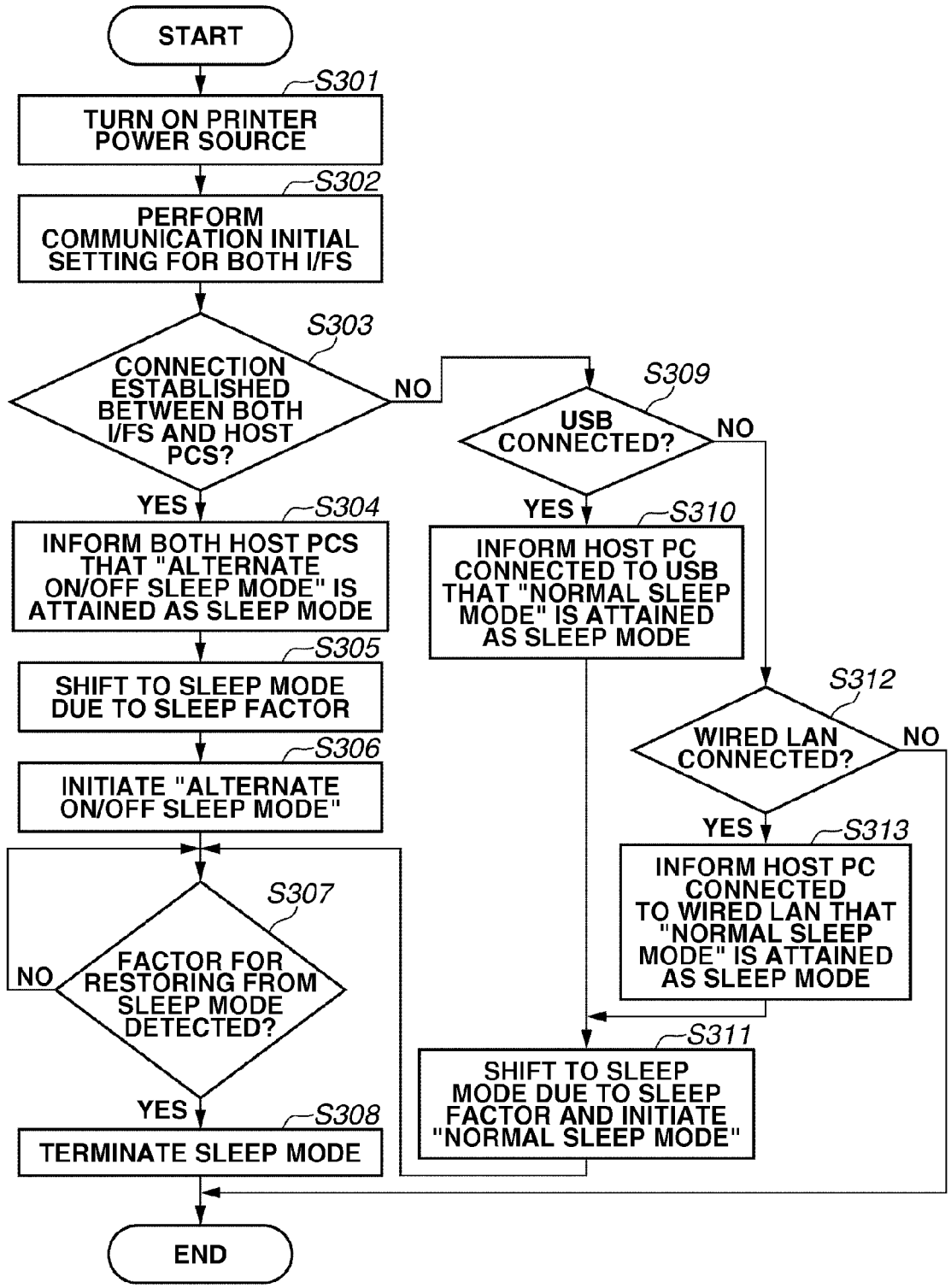
FIG. 5 is a flowchart illustrating a power source control method for the printing apparatus.

FIG. 5 is a flowchart illustrating the power source control method for the printing apparatus according to the present exemplary embodiment. This method corresponds to the processing from turning on the power source of the printing apparatus 103 to placing the apparatus in the alternate ON/OFF sleep mode. Each step in the flowchart is realized by a central processing unit (CPU) provided in the controller unit 201 that loads a control program from a read-only memory (ROM) or the like to a random-access memory (RAM) and executes the program. The following description is directed towards an example in which switching control is performed between a first sleep mode in which the power supply to anyone of the interfaces is turned off and a second sleep mode in which the power supply to a plurality of interfaces is turned on and off repeatedly at predetermined time intervals.

First, in step S301, the controller unit 201 detects that a main power switch (not illustrated) is turned on, and supplies power to the entire printing apparatus 103 from a power source 214.

In step S302, the controller unit 201 initializes settings on the USB and the wired LAN, and operates communication protocols of respective interfaces. In step S303, the main control unit 204 of the controller unit 201 determines whether the connection is normally established between the data processing apparatuses and both interfaces as the result of the operation of the communication protocols in step S302.

If it is determined that both interfaces of the controller unit 201 are connected (YES in step S303), the procedure advances to step S304, whereas if not (NO in step S303), the procedure advances to step S309. In determining whether the USB connection is established, the USB control unit 205 detects whether the data processing apparatus 102 is connected to the interface via the USB cable, and informs the controller unit 201 of the detection result.

In determining whether LAN connection is established, the physical layer chip 207 detects whether the data processing apparatus 101 is connected to the interface via the LAN cable, and informs the main control unit 204 of the detection result via the LAN control unit 206.

Accordingly, when the controller unit 201 detects that the USB connection and the wired LAN connection are both established, the procedure advances to step S304. In step S304, the controller unit 201 informs the data processing apparatus 101 and the data processing apparatus 102 that the controller unit 201 will shift to the "alternate ON/OFF sleep mode" when being placed in the sleep mode.

In this case, the controller unit 201 informs the data processing apparatus 101 and the data processing apparatus 102 of an alternate ON/OFF sleep command 701 as illustrated in FIG. 6. In step S305, the controller unit 201 is shifted to the sleep mode by a timer or a forcible sleep switch. In step S306, the alternate ON/OFF sleep mode is started by the power source control unit 209.

In step S307, the controller unit 201 determines whether a factor for restoring from the sleep mode is detected. If the controller 201 determines that the factor for restoring from the sleep mode is detected (YES in step S307), the sleep mode due to the power source control unit 209 is terminated, and the controller unit 201 shifts the printing apparatus 103 into a standby state.

In step S307, when it is determined that no factor for restoring from the sleep mode is detected (NO in step S307), the main control unit 204 of the controller unit 201 continues to detect the factor for restoring.

In step S303, when the controller unit 201 determines that the establishment of both interface connections is not detected (NO in step S303), the procedure advances to step S309. In step S309, the controller unit 201 determines whether USB connection is established. If the controller 201 determines that the establishment of the USB connection is detected (YES in step S309), the procedure advances to step S310.

In step S310, the main control unit 204 of the controller unit 201 informs the data processing apparatus 102 capable of communication that the sleep mode in the state in which the USB connection is established is the "normal sleep mode."

In this case, the data processing apparatus 102 is informed of a normal sleep command 801 as illustrated in FIG. 6B by the controller unit 201. Then, in step S311, the controller unit 201 is shifted to the normal sleep mode by the timer or the forcible sleep switch of depressing a key 213. Then in step S307, the controller unit 201 determines whether the factor for restoring from the sleep mode is detected.

In step S309, if the controller unit 201 determines that the USB connection is not established (NO in step S309), then in step S312, the controller unit 201 determines whether connection with the wired LAN is established. When the controller unit 201 determines that connection with the wired LAN is established (YES in step S312), the procedure advances to step S313. In step S313, the controller unit 201 informs the data processing apparatus 101 capable of communication that the sleep mode in the state in which the wired LAN connection is established is the "normal sleep mode."

Then, in step S311, the main control unit 204 is shifted to the normal sleep mode by the timer or the forcible sleep switch of depressing the key 213. Then in step S307, the controller unit 201 determines whether the factor for restoring from the sleep mode is detected In step S312, if the controller unit 201 determines that connection with the wired LAN is not established (NO in step S312), the processing in this flowchart is completed.

FIGS. 7A and 7B are flowcharts illustrating the power source control method for the printing system according to the present exemplary embodiment. The method corresponds to the alternate ON/OFF sleep mode restoring sequence processing between the printing apparatus 103 and the data processing apparatus 101 or the data processing apparatus 102. For discussion purposes only, the following description will only refer to data processing apparatus 101.

Each step of the processing on the data processing apparatus 101 side as illustrated in FIG. 7A is realized by the CPU of the data processing apparatus 101, which loads a control program to a RAM from a ROM, hard disk (HDD) or the like, and executes the same. The above-described control program includes a printing apparatus driver described below. Each step of the processing on the printing apparatus 103 side as illustrated in FIG. 7B is realized by the CPU provided in the power source control unit 209, which loads a control program to a RAM from a ROM or the like, and executes the same.

First, in steps S401 and S408, the data processing apparatus 101 and the printing apparatus 103 are connected with each other in the alternate ON/OFF sleep mode.

In step S402, a printing apparatus driver on the data processing apparatus 101 detects that a print job is generated from an application on the data processing apparatus 101 operated by the user.

Then, the procedure advances to step S403, where it is determined whether the printing apparatus 103 is at present in the turn-ON time of the alternate ON/OFF sleep mode. On the lower side of FIG. 4, there are illustrated the operational waveforms of the LAN_PWR signal and the USB_PWR signal.

Illustrated on the upper side of FIG. 4 is the transition of the total power consumption of the printing apparatus 103 in response to the changes in the signals illustrated on the lower side. For example, when the LAN_PWR signal is changed from "High" to "Low," the power change in the wired LAN connection indicated on the upper side by the solid line is also changed from "High" to "Low." Similarly, when the USB_PWR signal is changed from "Low" to "High," the power change in the wired USB connection indicated on the upper side by the dotted line is also changed from "Low" to "High."

From the change in each signal, a delay time in the power change of the printing apparatus 103 can be set to an arbitrary time inside the timer control unit 208.

Further, the "USB turn-ON time," "LAN turn-ON time," "USB turn-OFF time," and "LAN turn-OFF time" illustrated in FIG. 4 can also be set to arbitrary times inside the control unit 208. An operation similar to that described above is also conducted in the data processing apparatus 101.

In step S403, the CPU of the data processing apparatus 101 determines whether it is still during the turn-ON time from the "(USB or LAN) turn-ON time" illustrated in FIG. 4. The printing apparatus 103 transmits information about the above-described setting to the data processing apparatus 101 in step S504 in FIG. 8, which is described below.

In step S403, if the CPU of the data processing apparatus 101 determines that it is during the turn-ON time (YES in step S403), then in step S405, the data processing apparatus 101 transmits a sleep cancel command 901 as illustrated in FIG. 6C to the printing apparatus 103.

In step S409, the main control unit 204 in the controller unit 201 of the printing apparatus 103 waits for the sleep cancel command 901 illustrated in FIG. 6C. If the main control unit 204 in the controller unit 201 of the printing apparatus 103 detects the sleep cancel command 901 illustrated in FIG. 6C (YES in step S409), in step S410, the "alternate ON/OFF sleep mode" is canceled, and the printing apparatus 103 sifts to the standby state.

In this case, the power source control unit 209 of the printing apparatus 103 supplies power to the USB control unit 205, the LAN control unit 206, and the physical layer chip 207 of the LAN.

In step S411, the controller unit 201 of the printing apparatus 103 informs data processing apparatus 101 that the "alternate ON/OFF sleep mode" is canceled. In this case, the controller unit 201 of the printing apparatus 103 transmits a sleep cancel response command 1001 illustrated in FIG. 6D to the data processing apparatus 101. This operation may be replaced by a method in which the data processing apparatus 101 reads a status from the printing apparatus 103 through poling.

In step S406, the data processing apparatus 101 waits for the sleep cancel response command 1001 illustrated in FIG. 6D, and when the sleep cancel response command 1001 transmitted from the printing apparatus 103 is detected (YES in step S406), the procedure advances to step S407. In step S407, the data processing apparatus 101 transmits the print job to the printing apparatus 103, then the present processing is completed.

In step S412, the main control unit 204 of the printing apparatus 103 waits for the print job to be received from the data processing apparatus 101. If the print job is received (YES in step S412), in step S413, the main control unit 204 prints the print job received from the data processing apparatus 101, then the present processing is completed.

Figure 8:
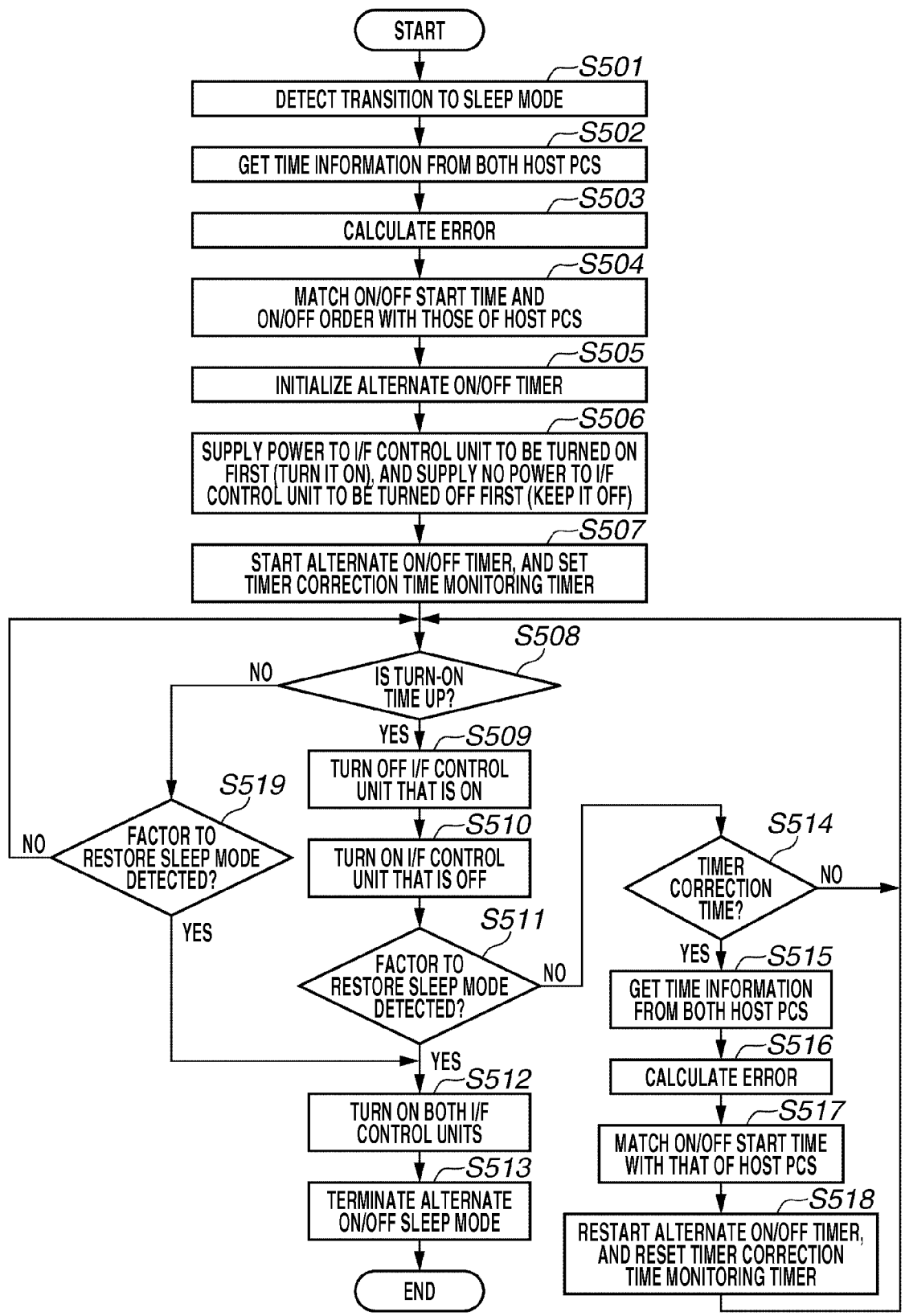
FIG. 8 is a flowchart illustrating the power source control method for the printing apparatus.

FIG. 8 is a flowchart illustrating the power source control method for the printing apparatus 103 according to the present exemplary embodiment. The method includes procedures to be executed by the printing apparatus 103 in steps S305 and S306 in FIG. 5. Each step in the procedures is realized by the CPU provided in the controller unit 201, which loads to a RAM a control program from a ROM or the like, and executes the same.

First, in step S501, the controller unit 201 detects the transition to the sleep mode. The condition for the transition to the sleep mode may be a sleep time count-up factor controlled by the timer control unit 208 inside the controller unit 201. The transition to the sleep mode may also be executed by depressing the key 213 on the operation unit 212 of the printing apparatus 103. Further, the transition to the sleep mode may be executed by an operation on the status display window 105 for monitoring the condition of the printing apparatus 103 which is provided on the data processing apparatus 101 or the data processing apparatus 102.

In step S502, the main control unit 204 of the controller unit 201 obtains time information from the data processing apparatus 101 and the data processing apparatus 102. This time information is a real time. In step S503, the main control unit 204 of the controller unit 201 calculates an error of the time information and stores it in a memory inside the timer control unit 208.

In step S504, the timer control unit 208 of the controller unit 201 determines the turning-ON/OFF start time using the calculated error value and the interface to be turned on first (or, conversely, the interface to be turned off first), and transmits the determination results to each of the data processing apparatuses. Accordingly, a display timing can be adjusted so as to synchronize with the turning ON and OFF of the printing apparatus 103. In step S505, the timer control unit 208 of the controller unit 201 initializes the alternate ON/OFF timer inside the timer control unit 208.

In step S506, the controller unit 201 causes the power source control unit 209 to supply power from the power source 214 to the interface control unit to be turned on first and to stop the power supply to the interface control unit to be turned off first.

For example, when the interface control unit to be turned on first is the USB control unit 205, the USB_PWR signal is set to "High," and power is supplied to the USB control unit 205. Conversely, when the interface control unit to be turned off first is the LAN control unit 206, the LAN_PWR signal is set to "Low," and the power supply to the LAN control unit 206 and the physical layer chip 207 is stopped.

Next, in step S507, the alternate ON/OFF timer inside the timer control unit 208 in the controller unit 201 is started. In addition, the timer correction time monitoring timer, which monitors the timer correction time and is provided inside the timer control unit 208 in the controller unit 201, is set. Setting the timer correction time monitoring timer has a function of periodically monitoring the time deviation in alternate turning ON and OFF between the printing apparatus 103 and the data processing apparatuses 101, 102. The timer correction time monitoring timer may be set to an arbitrary time.

In step S508, the controller unit 201 detects the turn-ON time of the interface to which power is being supplied from the power source 214. When the controller unit 201 determines that the counting of the turn-ON time is completed (YES in step S508), in step S509, the power source control unit 209 stops the power supply to the interface control unit that is ON (i.e., turns it off). Then in step S510, the power source control unit 209 starts power supply to the interface control unit that has been OFF (i.e., turns it on).

During the turn-ON time detection (NO in step S508), in step S519, the controller unit 201 detects a factor for restoring from the sleep mode. When the controller unit 201 does not detect the factor for restoring from the sleep mode (NO in step S519), the procedures returns to step S508. When the controller unit 201 detects the factor for restoring from the sleep mode (YES in step S519), the procedure advances to step S512.

Then, the power source control unit 209 of the controller unit 201 repeats the procedures of steps S509 and S510, so that the procedure advances to step S511, where the power source control unit 209 of the controller unit 201 determines whether the factor for restoring from the sleep mode is detected.

If the controller unit 201 determines that the factor for restoring from the sleep mode is detected (YES in step S511), the procedure advances to step S512. If it is determined that there is no factor for restoring from the sleep mode (NO in step S511), the procedure advances to step S514. In step S514, the controller 201 determines whether it is the time for the timer correction time monitoring timer inside the timer control unit 208 to perform ON/OFF deviation correction. When the controller 201 determines that it is not the timer correction time (NO in step S514), the procedure returns to step S508.

In step S514, if the controller unit 201 determines that it is the time for timer correction (YES in step S514), in step S515, the controller unit 201 obtains time information from the data processing apparatus 101 and the data processing apparatus 102. This time information is real time. In step S516, the controller unit 201 calculates the error of the time information, and stores it in the memory inside the timer control unit 208.

In step S517, the controller unit 201 adjusts the turn-ON/OFF start time using the error value calculated in step S516 between the printing apparatus 103 and the data processing apparatus 101. In step S518, the alternate ON/OFF timer inside the timer control unit 208 in the controller unit 201 is restarted. In addition, the controller unit 201 resets the timer correction time monitoring timer for monitoring the timer correction time inside the timer control unit 208, and the procedure returns to step S508.

In step S511, if the controller unit 201 determines that the factor for restoring from the sleep mode is detected (YES in step S511), power is supplied to both interface control units from the power source 214. In step S513, the controller unit 201 gets out of the "alternate ON/OFF sleep mode," and the present processing is completed.

In the following description, the operational flow for correcting deviation in turn-ON/OFF timing between the printing apparatus 103 and the data processing apparatus 101 and the data processing apparatus 102 will be described.

In FIG. 8, when the procedure returns to step S511, and it is determined that no factor for restoring from the sleep mode is detected (NO in step S511), the procedure returns to step S508 in order to continue the alternate ON/OFF sleep mode. However, during the processing returning to step S508, the controller unit 201 determines whether there is any need to correct ON/OFF deviation (S514). When it is determined that it is not the time for correcting ON/OFF deviation (NO in step S514), the procedure returns to step S508.

In the present exemplary embodiment, in step S514, if it is determined that it is the time for the timer correction time monitoring timer to perform ON/OFF deviation correction (YES in step S514), the procedure is controlled to advance to step S515.

FIG. 9 is a flowchart illustrating a job processing method for the data processing apparatus according to the present exemplary embodiment. In the method, the operation on the data processing apparatus side, in particular, the display on the status display window 105 is changed. Each step in the processing is realized by the CPU of the data processing apparatus 101, which loads to a RAM a control program stored in a ROM, HDD or the like, and executes the same.

In step S601, the CPU of the data processing apparatus 101 detects whether the data processing apparatus 101 is connected to the printing apparatus 103. Here, there are assumed cases where no power is being supplied to the printing apparatus 103 itself or where the cable of the interface is detached or damaged.

Figure 2A:
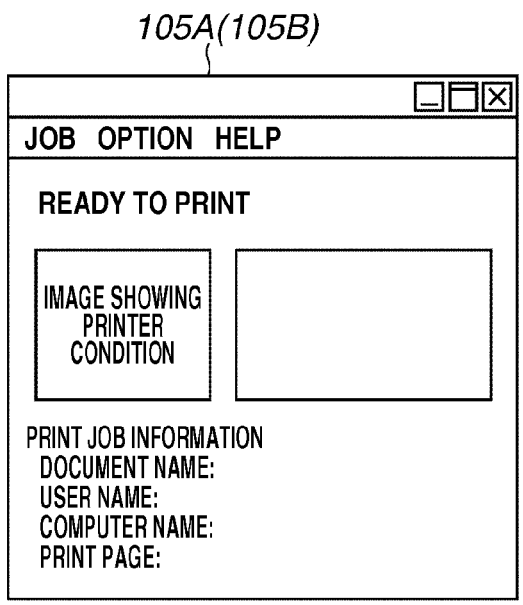
FIGS. 2A through 2D illustrate user interface (UI) screens that can be displayed on a display device with which a data processing apparatus is equipped.

When the CPU of the data processing apparatus 101 determines that the printing apparatus 103 is not connected thereto (NO in step S601), the procedure advances to step S602. In step S602, the CPU displays the UI screen indicating "communication error" as illustrated in FIG. 2C on the status display window 105 on the screen of the display device of the data processing apparatus 101. Here, the factor for determining that the data processing apparatus 101 is not connected to the printing apparatus 103 may be that the power source of the printing apparatus 103 is not ON or that the cable is not connected thereto.

In step S601, if the CPU of the data processing apparatus 101 determines that the printing apparatus 103 is connected thereto (YES in step S601), the procedure advances to step S603. In step S603, the CPU of the data processing apparatus 101 determines whether the alternate ON/OFF sleep command is received. When the CPU of the data processing apparatus 101 determines that the alternate ON/OFF sleep command mode is received (YES in step S603), the procedure advances to step S604.

In step S604, the CPU of the data processing apparatus 101 makes an inquiry about information such as the turning-ON/OFF start time, turn-ON time, turn-OFF time, and the order of the interfaces that start turning ON/OFF, and receives the relevant information from the printing apparatus 103. The information such as the turning-ON/OFF start time, turn-ON time, turn-OFF time, and the order of the interfaces that start turning ON/OFF has been previously described in connection with step S403 in FIG. 7.

In step S605, the CPU of the data processing apparatus 101 starts the alternate ON/OFF sleep mode according to the alternate ON/OFF mode starting time. At this time, during the alternate ON/OFF sleep mode, the data processing apparatus 101 updates the display on the status display window 105 in synchronization with a timing periodically obtained from the printing apparatus 103. More specifically, the CPU of the data processing apparatus 101 performs control to obtain from the printing apparatus 103 the information to be displayed on the status display window 105 in conformity with the period of the USB turn-ON time (or the LAN turn-ON time) illustrated in FIG. 4.

Figure 2B:
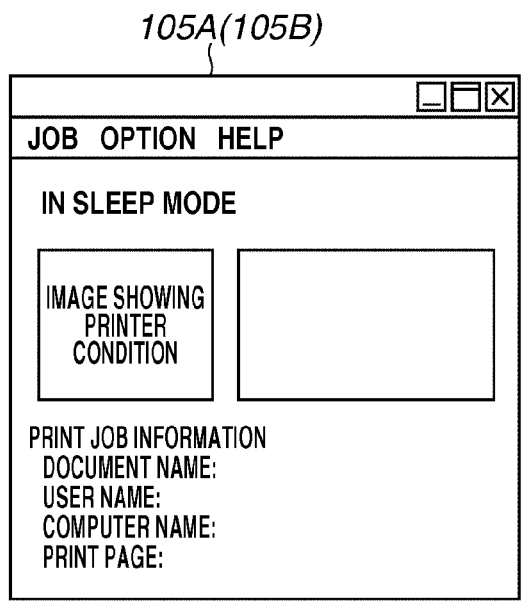
Figure 2C:
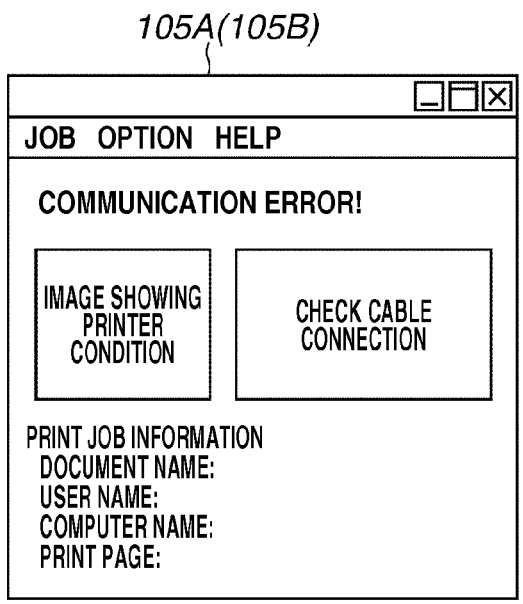

In step S606, the CPU of the data processing apparatus 101 indicates "in sleep mode" on the status display window 105 as illustrated in FIG. 2B.

In step S607, the CPU of the data processing apparatus 101 determines whether there is a factor for restoring from the sleep mode requiring updating the display of the status display window 105. When the CPU of the data processing apparatus 101 detects a factor for restoring from the sleep mode (YES in step S607), the procedure advances to step S608. In step S608, the CPU of the data processing apparatus 101 determines whether there is a print job.

Figure 2D:
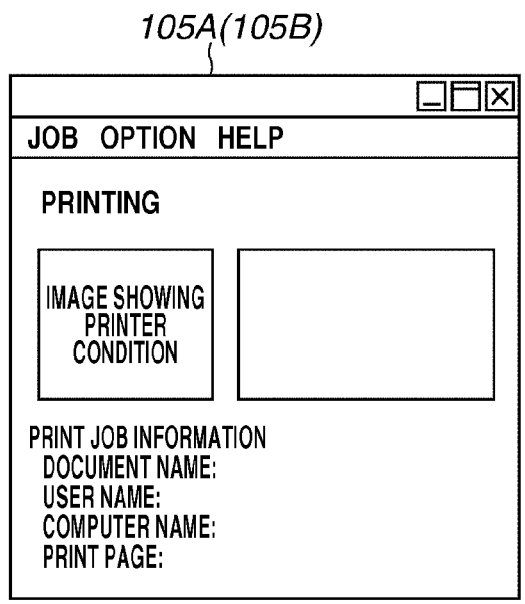

When the CPU of the data processing apparatus 101 determines that there is a print job (YES in step S608), in step S609, the CPU of the data processing apparatus 101 indicates "printing" as illustrated in FIG. 2D on the status display window 105.

In step S610, the CPU of the data processing apparatus 101 determines whether a status indicating completion of printing is received from the printing apparatus 103. When the CPU of the data processing apparatus 101 determines that a status indicating completion of printing is received from the printing apparatus 103 (YES in step S610), the procedure advances to step S611. In step S611, the CPU of the data processing apparatus 101 indicates "ready to print" on the status display window 105 as illustrated in FIG. 2A, and the procedure returns to step S601.

In step S608, if the CPU of the data processing apparatus 101 determines that there is no print job (NO in step S608), the procedure returns to step S601, and it is determined whether the data processing apparatus 101 is connected to the printing apparatus 103.

When, in step S607, the CPU of the data processing apparatus 101 determines that no factor for restoring from the sleep mode is detected (NO in step S607), the procedure returns to step S606.

According to the present exemplary embodiment, there is provided a printing apparatus which can suppress the power consumption of the entire printing apparatus even when a plurality of data processing apparatuses are respectively connected to a plurality of interfaces included in the printing apparatus, without cutting off the interface communication. Further, the present exemplary embodiment can provide a printing system that does not issue any unnecessary error indication.

Aspects of the present invention can also be realized by a computer of a system or apparatus (or devices such as a CPU or an MPU) that reads out and executes a program recorded on a memory device to perform the functions of the above-described embodiment, and by a method, the steps of which are performed by a computer of a system or apparatus by, for example, reading out and executing a program recorded on a memory device to perform the functions of the above-described embodiment. For this purpose, the program is provided to the computer for example via a network or from a recording medium of various types serving as the memory device (e.g., computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-104054 filed May 9, 2011, which is hereby incorporated by reference herein in its entirety.

What is claimed is:

1. A method for controlling a printing apparatus that operates in a plurality of power modes, the method comprising:
   shifting a power mode of the printing apparatus into a power saving mode; and
   controlling power supplied to a first communication interface and a second communication interface of the printing apparatus so as to, in a case where the power mode of the printing apparatus is shifted into the power saving mode, alternately shift between a state of the first communication interface and a state of the second communication interface into a turn-on state at predetermined time intervals so that when the state of the first communication interface is in the turn-on state, the state of the second communication interface is not in the turn-on state, and when the state of the first communication interface is not in the turn-on state, the state of the second communication interface is in the turn-on state.

2. A non-transitory computer-readable storage medium storing computer-readable instructions for causing a printing apparatus to execute the method of claim 1.

3. A printing apparatus that operates in a plurality of power modes, the printing apparatus comprising:
   a first communication interface;
   a second communication interface;
   a control unit configured to control power supplied to the first communication interface and power supplied to the second communication interface so as to, in a case where a power mode of the printing apparatus is shifted into a power saving mode, alternately shift a state of the first communication interface and a state of the second communication interface into a turn-on state at predetermined time intervals so that when the state of the first communication interface is in the turn-on state, the state of the second communication interface is not in the turn-on state, and when the state of the first communication interface is not in the turn-on state, the state of the second communication interface is in the turn-on state.

4. The printing apparatus according to claim 3, wherein the first communication interface is a local-area network (LAN) interface and the second communication interface is a universal serial bus (USB) interface.

5. The printing apparatus according to claim 3, further comprising a timer control unit configured to set a time when the first communication interface is turned on or off and a time when the second communication interface is turned on or off.

6. The printing apparatus according to claim 3, further comprising:
   a determination unit configured to determine whether both the first communication interface and the second communication interface are each capable of communicating with an external device,
   wherein in a case where the determination unit determines that both the first communication interface and the second communication interface are each capable of communicating with an external device, the control unit performs control in such a manner that power is alternately supplied to the first communication interface and the second communication interface.

7. The printing apparatus according to claim 6, further comprising, wherein in a case where the determination unit determines that the first communication interface is capable of communicating with an external device and the second communication interface is not capable of communicating with an external device, the control unit stops power supply to the second communication interface and maintains power supply to the first communication interface in a sleep mode.

* * * * *